US009286742B2

(12) United States Patent
Rosener et al.

(10) Patent No.: US 9,286,742 B2
(45) Date of Patent: Mar. 15, 2016

(54) USER AUTHENTICATION SYSTEM AND METHOD

(75) Inventors: Douglas K Rosener, Santa Cruz, CA (US); William O Brown, Santa Cruz, CA (US); Edward L Reuss, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 1449 days.

(21) Appl. No.: 12/060,031

(22) Filed: Mar. 31, 2008

(65) Prior Publication Data

US 2009/0249478 A1    Oct. 1, 2009

(51) Int. Cl.
*G06F 12/14*    (2006.01)
*G07C 9/00*    (2006.01)
*G06F 21/31*    (2013.01)
*G06F 21/32*    (2013.01)
*G06F 21/34*    (2013.01)
*G06F 21/40*    (2013.01)

(52) U.S. Cl.
CPC ............ *G07C 9/00087* (2013.01); *G06F 21/31* (2013.01); *G06F 21/316* (2013.01); *G06F 21/32* (2013.01); *G06F 21/34* (2013.01); *G06F 21/40* (2013.01); *G06F 2221/2137* (2013.01)

(58) Field of Classification Search
CPC ..... G06F 21/56; G06F 21/561; G06F 21/563; G06F 21/564
USPC ................................ 726/18, 20; 713/172–174
See application file for complete search history.

(56) References Cited

U.S. PATENT DOCUMENTS

| | | | | |
|---|---|---|---|---|
| 7,664,463 | B2* | 2/2010 | Ben Ayed | 455/41.2 |
| 8,009,874 | B2* | 8/2011 | Brown | H04M 1/05 382/115 |
| 8,335,312 | B2* | 12/2012 | Gerhardt | H04M 1/6066 379/430 |
| 2003/0025603 | A1 | 2/2003 | Smith | |
| 2004/0242201 | A1* | 12/2004 | Sasakura et al. | 455/411 |
| 2005/0221798 | A1* | 10/2005 | Sengupta et al. | 455/411 |
| 2005/0280546 | A1* | 12/2005 | Ganley et al. | 340/573.4 |
| 2006/0023865 | A1 | 2/2006 | Nice et al. | |
| 2006/0136741 | A1* | 6/2006 | Mercredi | 713/185 |
| 2007/0262951 | A1* | 11/2007 | Huie et al. | 345/156 |
| 2008/0076572 | A1* | 3/2008 | Nguyen et al. | 463/42 |
| 2009/0050689 | A1* | 2/2009 | Sako et al. | 235/375 |

FOREIGN PATENT DOCUMENTS

EP    1185058 A2    3/2002

OTHER PUBLICATIONS

European Patent Office. Communication Relating to the Results of the Partial International Search: PCT/US2009/031601. Apr. 2009. Netherlands, Rijswijk.
European Patent Office. International Search Report: PCT/US2009/031601. Jun. 2009. Netherlands, Rijswijk.
European Patent Office. Written Opinion of the International Searching Authority: PCT/US2009/031601. Jun. 2009. Munich, Germany.

* cited by examiner

*Primary Examiner* — Tamara T Kyle

(74) *Attorney, Agent, or Firm* — Dienwiebel Transatlantic IP

(57) ABSTRACT

A user authentication system and method are disclosed. The user authentication system includes an authentication device which can be donned and doffed by the user, a sensor to determine whether the authentication device is donned or doffed by the user, and an authentication server to receive information from the sensor and to authenticate the user based on whether the authentication device is donned by the user.

23 Claims, 9 Drawing Sheets

USER AUTHENTICATION SYSTEM AND METHOD

CROSS-REFERENCE TO RELATED APPLICATIONS

This application is related to pending patent application Ser. No. 11/891,370 for "User Validation of Body Worn Device" filed on Aug. 10, 2007, the entire disclosure of which is incorporated herein by reference for all purposes.

FIELD OF THE INVENTION

The present invention generally relates to authentication of users for access to resources, including, for example, Internet and other computer based information.

BACKGROUND OF THE INVENTION

For the purposes of the following description, authentication can be understood to be the act of proving to a computer-based system (known as an authenticator) that a user is who she or he claims to be. User authentication is often described in terms of three factors:
Something you know (e.g. password)
Something you have (e.g. ATM card)
Something you are (e.g. fingerprint).
Authentication is the process of verifying one or more of these factors.

For example, a typical computer user is required to authenticate himself for a wide variety of purposes, such as logging in to a computer account, retrieving e-mail from servers, accessing certain files, databases, networks, web sites, etc. In banking applications, a bank account holder is required to enter a personal identification number (PIN) in order to access an automated teller machine (ATM) to conduct a banking transaction.

The main problem to be solved is authenticating in a convenient and secure way. For example, people often do financial transactions throughout the day on the Internet, and the more convenient it is, the more likely they will buy things. The more secure it is, the more merchants and customers will use it. As another example, people often do security access throughout the day (e.g. passing through doors or accessing their computer). The easier it is to do these things, the more people can focus on the work at hand and not be distracted and frustrated by the inconvenience of repetitive interaction with security access.

Many systems for user authentication are available although none are completely satisfactory. For example, existing authentication solutions are usually one or two-factor and have a user do one or both of the following: a) Show, insert, or swipe a security token; b) Type a password, personal information or personal identification number (PIN), also called credentials.

A token is a generic term for a physical object that has a unique identifier or other information and can be communicated in some way. For example a token can be a physical card with embossed-plastic, magnetic-strip, or programmable memory. A smart card contains programmable-memory and a microprocessor for file maintenance and encryption and generally adheres to an industry standard. RFID tags are another type of token and use a short-range magnetic field to communicate, and often to power themselves. Different versions can act as a memory or smart cards.

An example where only a token is required (single factor) is a "dongle" attached to a USB port of a PC that allows software applications to be used. These dongles are constantly being bypassed with software "cheats", available on the Internet.

Many devices have unique IDs and use a secure link with a network based on this. For example, a Bluetooth headset communicating to a computer or cell-phone uses such a device-dependent link. In Bluetooth, the user is required to "pair" two devices (a master and a slave, each with a unique IEEE EUI-48 address) by entering a PIN code in the slave. This results in an authentication of shared secret keys between master and slave, generated from the PIN, a random number, and unique ID of the slave. If the keys are not identical the slave is not authenticated and pairing is denied. It should be understood that instead of a Bluetooth link another, similar wireless link may be substituted, such as Wibree, Wi-Fi, UWB, etc. Alternatively the link could be a wired connection.

An ATM transaction is an example of two-factor authentication. The ID card is inserted (factor 1) and a PIN (factor 2) is entered. This is considered more secure than online purchases because of the multiple factors. More recently for online transactions, ID cards can now display a temporary password that can be typed in after user name and password. This brings online transactions to two-factor security level as well.

Using tokens and/or passwords is both tedious and often not very secure. For example, others can see or overhear passwords, and steal credit cards and RFID tags. A major problem is remembering multiple passwords and users are forced either to use the same password for all authentication systems (not secure) or forever recover/reset passwords as they become forgotten. Furthermore a user is often required to fish a token out of a pocket or purse, which can be a major inconvenience in crowded or hurried situations.

As other examples, input/output (I/O) devices can be used. Typically, users authenticate themselves using passwords, ID-cards and/or biometrics to an authentication system through one or more I/O devices separate from the user. Input is for taking in passwords and biometric data or reading ID-cards. Output is for displaying secret codes or menu prompts.

Examples of an authentication system using an I/O device are a user entering a password using the keyboard (I/O device) to access the network (authenticator). Another example is placing an RFID tag near a tag reader (I/O device) to unlock a door (authenticator). One final example is making a purchase at a supermarket, by swiping a credit card in a reader displaying the purchase amount (I/O device), signing with an electronic pen (I/O device) at the cashier (authenticator).

Some system designers increase security by adding an I/O device that performs biometric sensing (something you are). Adding this third-factor of authentication to the authenticator makes stealing things harder, or alternatively can (in theory) allow other factors to be dropped. However, biometrics are still considered by many to be costly and not completely reliable. Examples of biometrics are voice authentication (requiring a microphone I/O device) and fingerprint reading (requiring a finger scanner I/O device).

As a final example, a phone-delivered stock transaction is an example of a limited use of biometrics as part of a two-factor authentication. Not only does the user provide something he knows like his mother's maiden name (factor 1) but the authenticator records his voice for possible later verification (factor 2). In fact, he must talk to a person (rather than leave a message). This person ensures that it is a live conversation and not just a playback (increasing the security value of the factor). Unfortunately, today, there are voice synthesizers that can dynamically create voices (based on text entry) that meet many of the biometrics of a person, created from an earlier recording, pulling out their voice's salient features. Therefore, the security level of this practice by stock brokerage firms will soon approach the single-factor security level of online stock transactions, which are already acceptable in online transactions.

Often, the authenticator (person or software that wants to authenticate the user) makes use of an authentication/identity server. An authentication identity provider/server does the following with respect to the authentication state of the user to the authenticator:
  Takes in user specific data (password, card ID, biometrics hereafter called "credentials")
  Analyzes credentials and determines authentication status
  Records when a successful or failed authentication occurs
  Monitors authentication expiration time for a given user
  Revokes authentication under specified conditions or events (timeout for example)
  Reports to requestors the authorization status of a given user
  Provides a cookie/ticket/certificate/key, which are typically small amounts of digital data (hereafter called "digital credentials") to an authenticator (a website server for example) or user agent (browser software for example).

The server contains an analyzer. It examines the user/password data, token information or biometric data and generates digital credentials based on this data. The authenticator has shared data or a database for its users and compares the digital credentials received from the server to its data.

Often, the authentication server and the authenticator are co-located. In particular, the server can be a subsystem of the authenticator. A personal computer for example has a logon software subsystem dedicated to authenticating the user (authentication server), and software subsystems (authenticators) which check the status before proceeding. The user, server, and authenticator follow a protocol to authenticate the user. There are many authentication protocols in existence and/or being developed. Examples are OpenID, SAML, and Kerebos.

When queried by an authenticator, the authentication server indicates (serves) this state to the authenticator by sending the digital credentials. In some cases (Kerebos for example), a software "user agent" retains the digital credentials (called tickets) and gives them directly to the authenticator as needed. If the digital credentials are stored, this eliminates the need for the user to re-enter their credentials directly the next time they are needed by the same authenticator.

One problem is knowing when the user authentication is no longer valid. This is typically achieved with a time-out. For instance an ATM window will close down, or the computer screen will lock. However this is sometimes annoying because the user may still be valid and is forced to re-enter credentials.

Data integrity can be provided to the digital credentials. This ensures that they are from the specified source rather than manufactured or copied by a malicious attacker. It furthermore can ensure that nothing has been modified. Examples of data integrity are Digital Signatures and message authentication codes (MACs).

Digital Signatures are encrypted certificates that use public/private key ciphers and are usually traceable to a trusted root source. This is currently available on PC email systems for sending signed and encrypted email. First a certificate is made containing at a minimum, the public key and the signed certificate of the source of the keys (the certificate authority or CA). It may also contain other information (like user name, validity date, and a hash of the data being sent).

Then the private key (known only to the source) encrypts (signs) a hash of the certificate. Hashing is the process of taking a large piece of data and mapping it into an almost unique fixed length of data. This is done because private key encryption is generally more computationally intensive than shared key encryption. If desired, the data and certificates can be encrypted (typically with a symmetric key), but this is not required.

The encrypted certificate hash can only be decoded using the public key associated with the private key, ensuring the source. The receiver can perform the same hashing algorithm and if they get the same hash as the decrypted value, the data has not been corrupted. Furthermore, they can apply this to the embedded signed CA credential and verify the CA certificate has not been corrupted and the public key truly came from this source. This can continue to a root trusted source (like Verisign).

MACs rely on shared symmetric keys known by both parties. The digital credentials are encrypted (signed) using these shared keys. (A hash can be encrypted instead, as in a digital signature). Since the parties share the same key, they can decrypt each other's information and conclude that the other party is the trusted source. Bluetooth pairing relies on this mechanism. The shared key is the PIN, and this is used to encrypt digital credentials to confirm the device is acceptable to be paired with. In both cases (MAC and Digital signatures), if the data has been changed, it will show up in the decryption/comparison process.

Another issue is that of the authentication credential cache and key-rings. As mentioned, the authenticator and authentication server are often located in the same place. However, a remote authenticator may wish to establish indirectly that a user is authenticated. This is done by the remote authenticator asking a trusted authentication server about a user's status. Some authentication systems are calling this concept of a collection of trusted authentication servers a "federated identity". This would allow remote authenticators to query and use the digital credentials supplied by a local authentication server. In some systems (Kerebos for example), the digital credentials can be authentication server-generic (called a ticket granting ticket) and the remote authenticators interact directly with the user agent rather than a server.

In order for this to work without requesting credentials from the user again, the server (or user agent) must store the user's digital credentials (or possibly just credentials). The location where one or more digital credentials are stored at an authentication server will be called here an authentication credential cache. In this case, a server with a credential cache can send digital credentials previously stored, to a remote authenticator. If a user agent (like a browser) stores the digital credentials from one or more authentication servers, it will be called a key-ring.

An example of this is when the user logs onto his computer, he has authenticated himself to his computer (regardless of whether the network is attached or not). When attached to his PC, the network server (a remote authenticator) consults the software on his PC (the local authentication server) to determine whether he is authenticated. He typically does not have to log on manually to every server his computer networks with. In this case, the PC is acting like an authentication server with a credential cache providing the user authentication to the network.

Furthermore, a user can have his PC remember websites that request usernames and passwords and have the computer automatically enter this data. This is very much like a key ring in that the user doesn't have to remember and enter the password for each site himself. The data is stored encrypted. However, once he has logged into his computer, if this feature is enabled, anyone can enter his username and password.

Recently, applications are being developed where cell phones and PDAs can act as the I/O device (taking in passwords or biometrics, or displaying secret data or code) for an authentication system. Furthermore, the cell phone or PDA can have a unique ID number. The effect of this is that the cell phone becomes effectively a token(something you have).

If the cell phone/PDA has an I/O interface, the authentication system no longer needs to provide an I/O device which can be costly, malfunction, or be vandalized. Furthermore, by adding the unique ID to the combination device, a separate token does not need to be carried. Some cell phones are adding fingerprint readers as well for biometrics. The user still has to enter a password repeatedly for transactions (to make theft of the possessed object less risky).

The alternative to this is having the cell phone/PDA act as an authentication server with credential cache. However, this makes the stealing of that object much more of a risk once the user has authenticated to it.

It can now be understood that improvements to user authentication systems are needed.

BRIEF SUMMARY OF THE INVENTION

Systems and methods for user authentication are disclosed. In one embodiment the user authentication system includes a headset and an authentication server. The headset includes a sensor which can determine whether the headset is doffed or donned by a user.

In operation of one embodiment of the invention the user first dons the headset, and then the user enters a password into the personal computer e.g. by typing on the keyboard. An authentication server determines the status of the headset based on signals from a Bluetooth radio which receives information from the sensor. The authentication server determines whether the entered password is correct based on comparison with information in a database. If the authentication server determines that the headset is donned and the password is correct the authentication server authenticates the user. On the other hand, if the authentication server determines that the headset is not donned or the password is not correct the authentication server does not authenticate the user. Later the user may wish to doff the headset, and the authentication server then revokes the user's authentication.

Further features and advantages of the present invention, as well as the structure and operation of the above-summarized and other exemplary embodiments of the invention, are described in detail below with respect to accompanying drawings in which like reference numbers are used to indicate identical or functionally similar elements.

BRIEF DESCRIPTION OF THE DRAWINGS

FIG. 6b is a flow chart illustrating steps in the operation of the embodiment shown in FIG. 6a.

DETAILED DESCRIPTION

Figure 1:
FIG. 1 is an illustration of an authentication device which can be donned and doffed by a user in accordance with an embodiment of the present invention.
Figure 2:
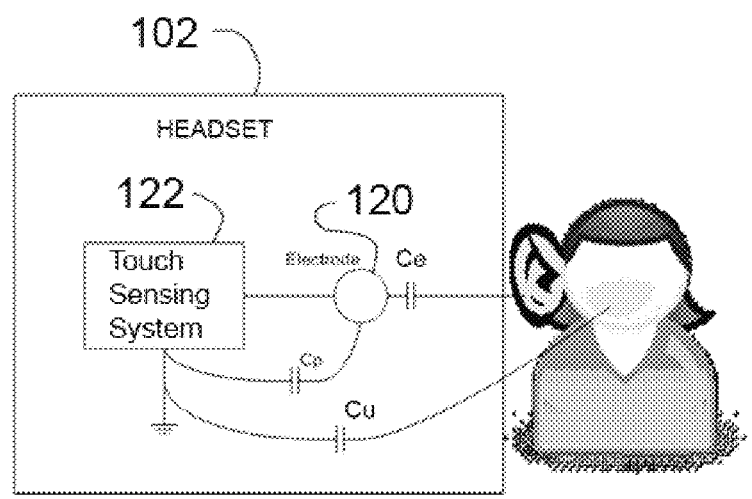
FIG. 2 is a schematic illustration of a headset and a user.
Figure 3:
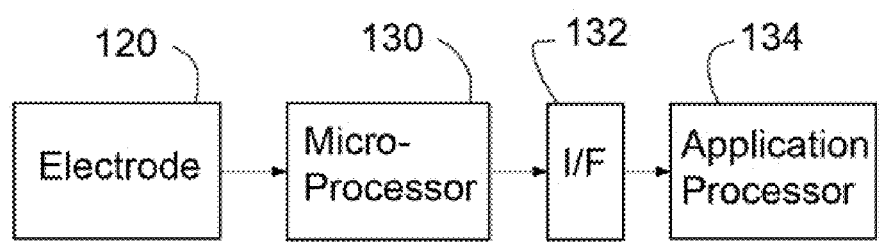
FIG. 3 is a block diagram of components of a DON/DOFF detector in accordance with an embodiment of the present invention.

FIGS. 1 and 2 illustrate a headset 102 with the capability to determine whether the headset 102 is doffed or donned. The headset 102 includes a body 104, a microphone 106 and an earpiece 108. Some of the components of the headset 102 are conventional and will not be discussed in detail. The headset 102 includes a system which determines whether the earpiece 108 is touching the user, and an embodiment of the system is shown in FIGS. 1-3 and discussed below.

It should be understood that in operation of the headset 102 the user inserts the earpiece 108 into the concha of the ear, and earpiece 108 fits snugly in the concha so that the headset 102 is supported by the user's ear. The earpiece 108 can be formed of electrically conductive material or alternatively an electrically conductive element 110 can be affixed to the earpiece 108 and located so that it is adjacent the user's ear when the earpiece 108 is installed in the concha. The electrically conductive element 110 can either contact the user's ear or be sufficiently close to the user's ear to permit detection of capacitance as discussed below. The electrically conductive earpiece 108 or the electrically conductive element 110 can be considered an electrode 120 in the circuit illustrated in FIG. 2 while the user's ear can be considered the opposing plate of a capacitor with the capacitance Ce. A touch sensing system 122 is electrically connected to the electrode 120, and the touch sensing system 122 determines whether the electrode 120 is touching the user's ear based on the capacitance Ce when the electrode 120 is touching the ear and when the electrode 120 is not.

It should be understood that the touch sensing system 122 can be located on a printed circuit board (PCB), and there is parasitic capacitance between the electrode 120 and the PCB ground plane which is schematically illustrated as Cp. The capacitance between the user's ear and the electrode 120 is indicated as Ce, and Cu indicates the capacitance between the PCB ground plane and the user.

Thus, assuming that Cp is negligible, the total capacitance seen by the touch sensing system 122 is the series capacitance of the electrode to the ear, Ce, and the head to the system, Cu. The capacitive connection of the user to the system ground Cu is usually a factor of 10 or more than the capacitance of the ear to the electrode Ce, so that the Ce dominates. In practice we have found that when the headset is located in the operational position so that the electrically conductive element 110 is in contact with the user's ear Ce can be about 0.5 pF and Cu can be greater than 5 pF.

Means which can be used for determining the capacitance of the electrode 120 are known and will therefore not be discussed in detail herein. For example the single-slope method or the dual slope method can be used. The single slope method involves driving the electrode with a DC current source and measuring the time for the capacitance to reach a reference level.

Figure 4:
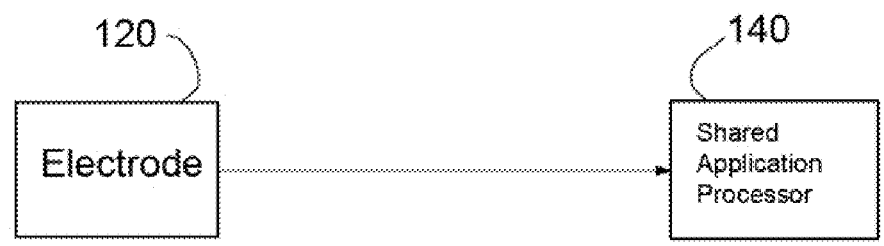
FIG. 4 is a block diagram of another embodiment of a DON/DOFF detector.

In FIG. 3 there is a block diagram illustrating the architecture of the system for capacitive touch sensing. The system includes the electrode 120, a microprocessor 130 to receive signals from the electrode and which includes interface firmware and touch sensing firmware to acquire and analyze the measured capacitance of the electrode 120. The system also includes an interface 132 which can be in the form of hardware or software and an application processor 134. FIG. 4 illustrates an alternative architecture of the system for capacitive touch sensing which is included as part of a system providing other functions of a computer. In the FIG. 4 system signals from the electrode 120 are transmitted to a shared application processor 140 which includes application firmware and touch sensing firmware to perform the necessary calculations.

In the embodiment described above the doffed or donned state of the headset is determined based on whether the electrode 110, or the earpiece 108 if the earpiece is conductive, is touching the user's ear. If the electrode is touching the user's ear or in close proximity to the user's ear, the headset is determined to be donned whereas if the electrode is greater than a predetermined distance from the user's ear the headset is determined to be doffed.

Figure 5:
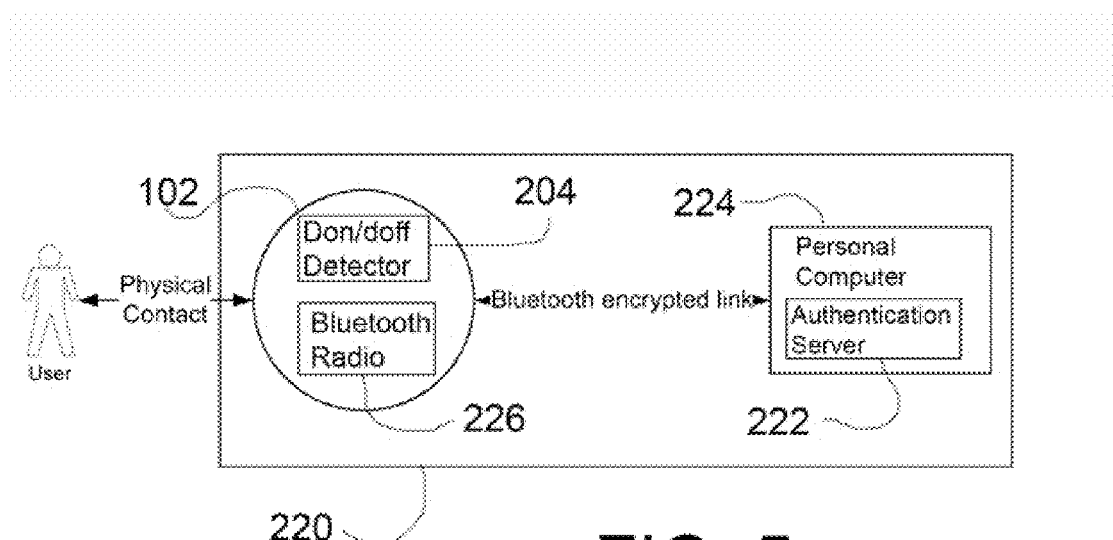
FIG. 5 is a block diagram of an embodiment of the present user authentication system.

In FIG. 5 an embodiment of the present user authentication system 220 is illustrated. The user authentication system 220 includes a headset 102 as described above and an authentication server 222. The headset 102 includes a don/doff detector 204 which can determine whether the headset is doffed or donned. In the present embodiment of the user authentication system 220 the don/doff detector 204 operates as discussed above in connection with FIGS. 1-3. Alternatively, however, the don/doff detector 204 can be constructed and operate according to any of the embodiments disclosed in U.S. patent application Ser. No. 11/542,385 filed Oct. 2, 2006 entitled "Donned and Doffed Headset State Detection," now U.S. Pat. No. 8,335,312.

The headset 102 includes a network interface, which in this embodiment is a Bluetooth radio 226. The Bluetooth radio 226 provides wireless communication with authentication server 222 which is included in a personal computer 224.

Figure 6:
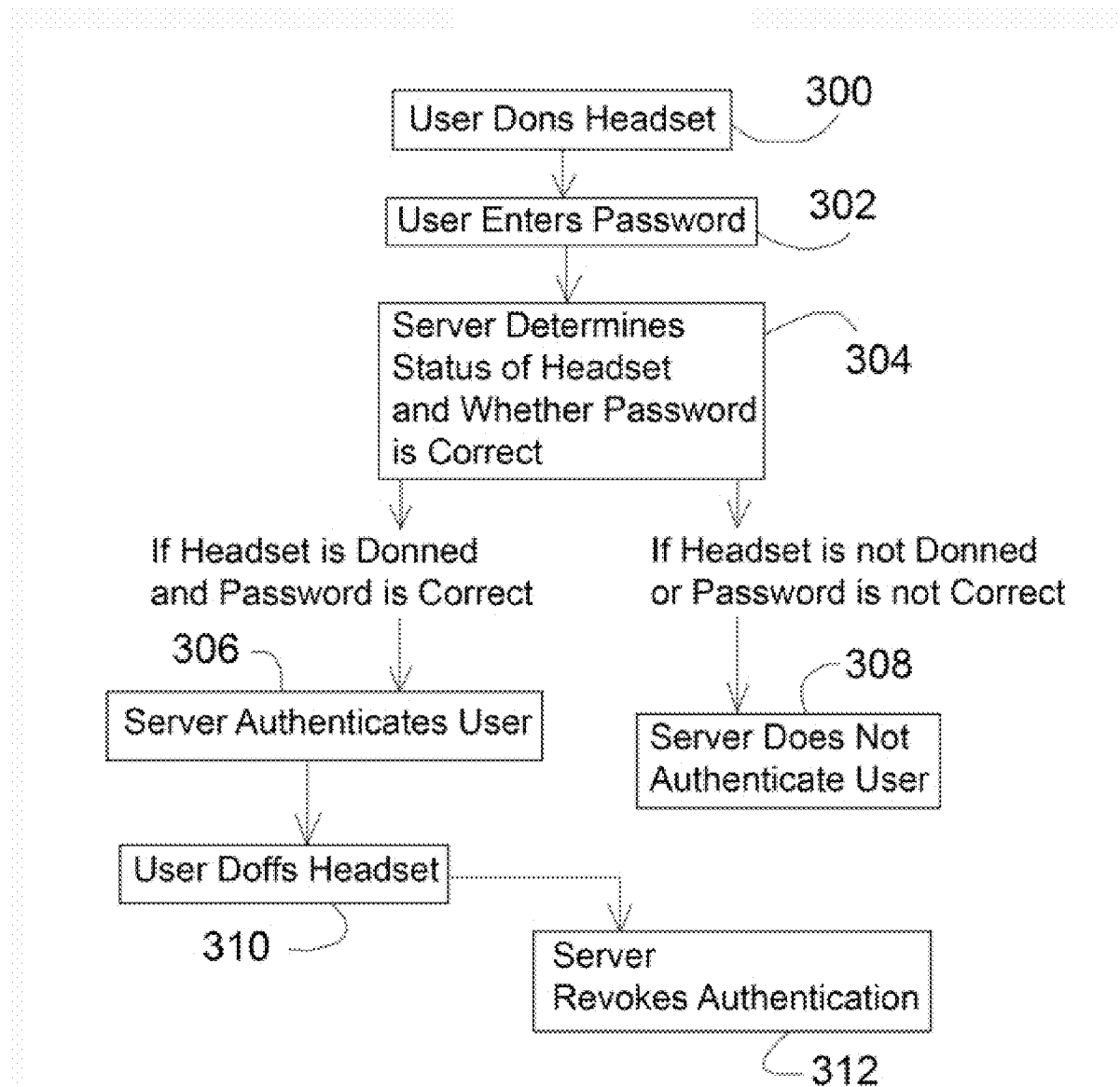
FIG. 6 is a flow chart illustrating steps in the operation of the embodiment shown in FIG. 5.

FIG. 6 illustrates steps in the operation of the embodiment shown in FIG. 5. In step 300 the user dons the headset 102, and in step 302 the user enters a password into the personal computer 224, e.g. by typing on the keyboard. In step 304 the authentication server 222 determines the don-doff status of the headset 102 based on signals from the Bluetooth radio 226 which receives information from the sensor 204. In step 304 the authentication server 222 determines whether the entered password is correct based on comparison with information in a database. If the authentication server 222 determines that the headset is donned and the password is correct the authentication server authenticates the user (step 306). On the other hand, if the authentication server 222 determines that the headset is not donned or the password is not correct the authentication server 222 does not authenticate the user (step 308).

Later the user may wish to doff the headset (step 310), and the authentication server 222 then revokes the user's authentication (step 312.)

Figure 6A:
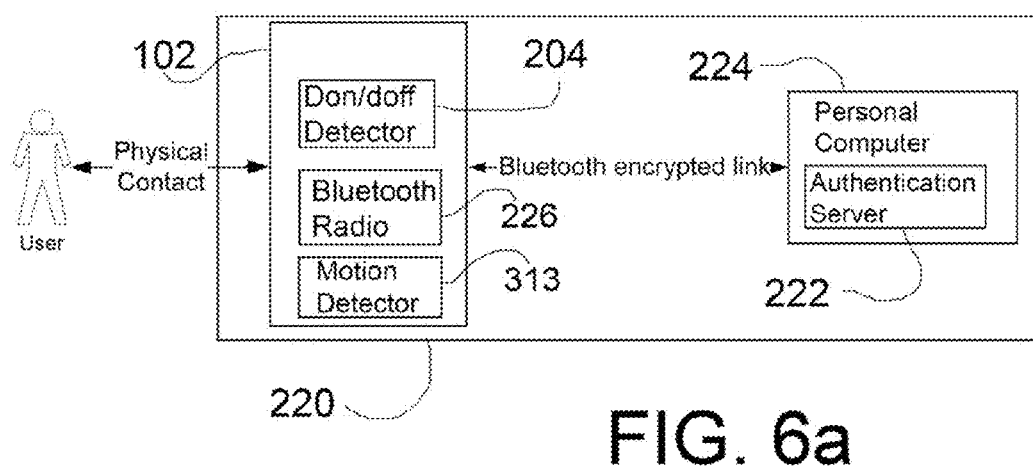
FIG. 6a is a block diagram of another embodiment of the present user authentication system.
Figure 6B:
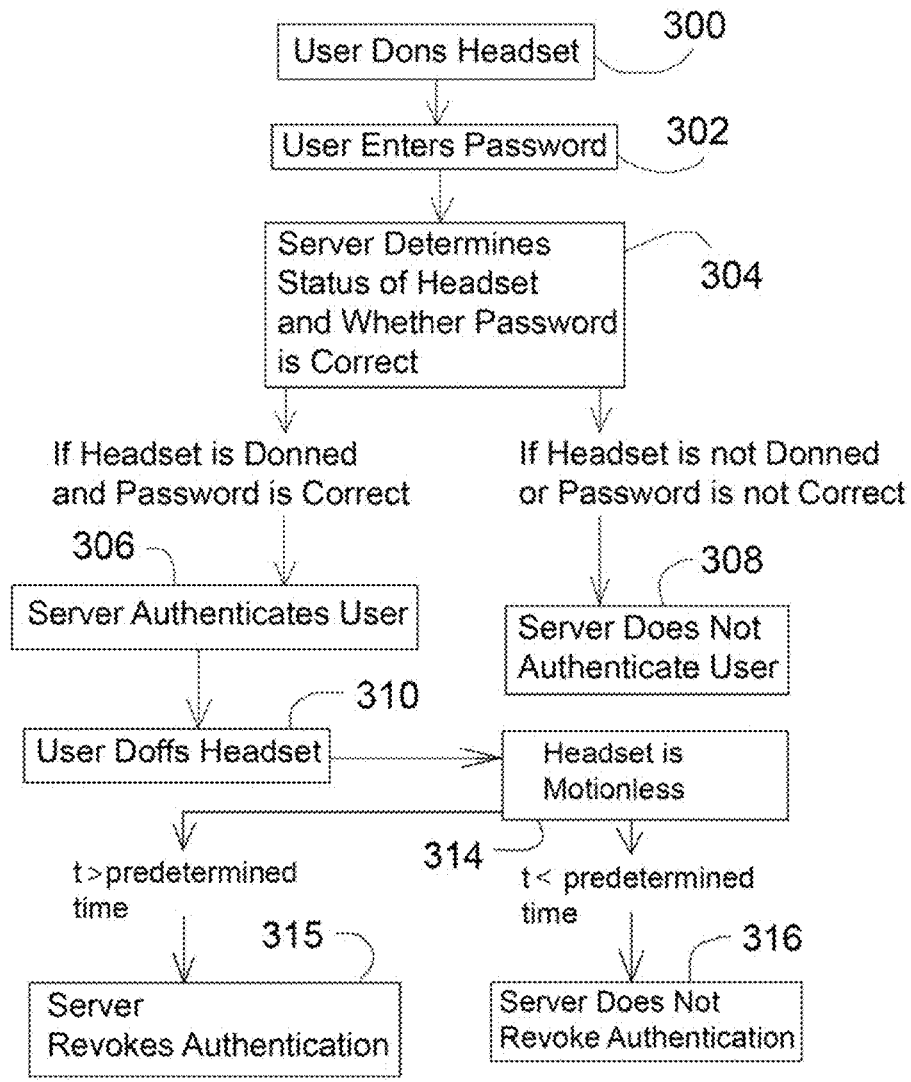

In FIGS. 6a and 6b another embodiment is shown. This embodiment is similar to the embodiment discussed above in connection with FIGS. 1-6, but the FIGS. 6a and 6b embodiment includes a motion detector 313 which senses the motion of the headset 102. The motion detector 313 can be of a conventional design and signals from the motion detector 313 are transmitted to the authentication server 222 via the Bluetooth encrypted link. In operation if the user doffs the headset 102 and then leaves the headset in a stationary location the authentication server 222 is configured to revoke authentication under predetermined conditions. More specifically, after the user doffs the headset 102, step 310, the user may then place the headset on a surface such as a desk so that the headset is motionless, step 314. If the headset 102 remains undisturbed on the desk for greater than a predetermined time then the authentication server 222 revokes authentication, step 315; whereas if the user picks up the headset 102 in less than the predetermined time the server 222 does not revoke authentication, step 316, and authentication remains in effect.

It should be understood that although a headset 102 is included with the embodiments of FIGS. 1-6b, a headset is only one type of authentication device which can be used, and alternative types of authentication devices which include a sensor to determine whether the authentication device is doffed or donned by the user or a motion sensor can likewise be used. Such other types of authentication devices include devices which can be worn and devices which can be carried.

A worn device is typically in constant physical contact (or closeness) with the user. This is to be distinguished from a carried device which is not in constant contact with the user. Examples of worn devices can be a headset, a heads-up display, a watch, or a pendant. A carried device might be a cell phone, a pen, or a key-fob.

It should also be understood that an authentication system according to another embodiment can make use of a personal area network (PAN) or a body area network (BAN). A PAN range is generally up to about 10 meters from a device, and a BAN is generally confined within a few inches of the body. An example of a PAN is a cell phone and headset communicating over Bluetooth or Wibree technology. An example of a BAN might be a watch and a headset that use the skin as a communication medium between them (Ident technologies Skin-Plex).

Figure 7:
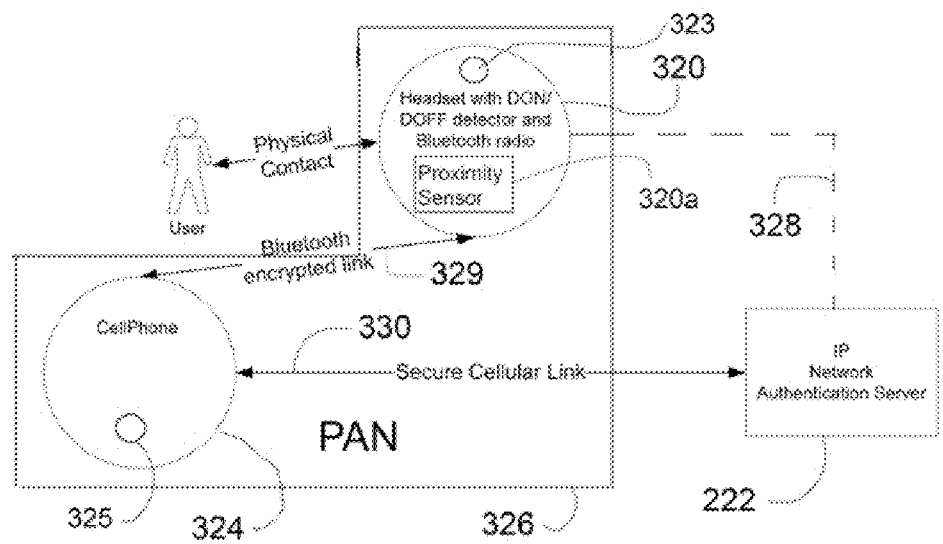
FIG. 7 is a block diagram of another embodiment of the present user authentication system.
Figure 8:
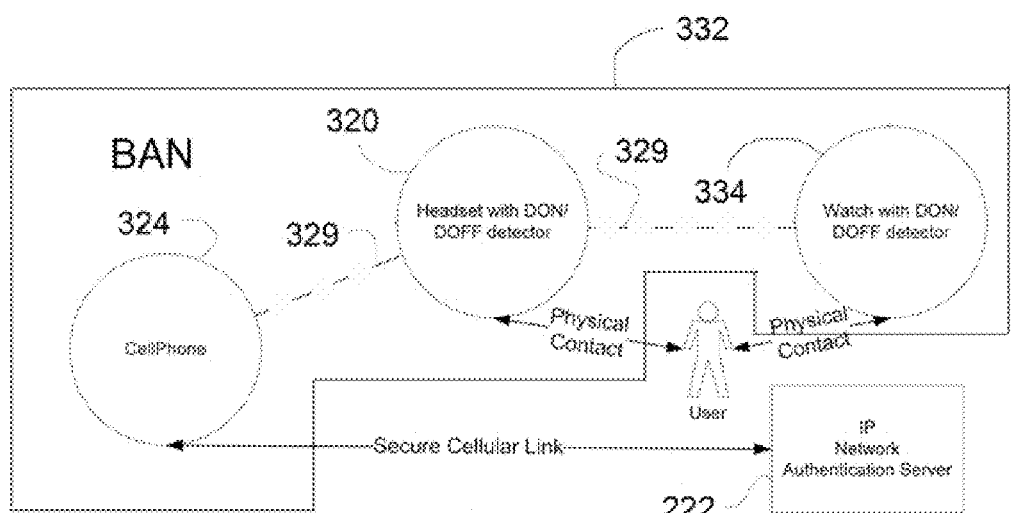
FIG. 8 is a block diagram of another embodiment of the present user authentication system.

In FIGS. 7 and 8 other embodiments are illustrated. In the embodiment shown in FIG. 7 a user authentication device 320 can for example be a headset with a DON/DOFF detector and Bluetooth radio. The user authentication device 320 and a cell phone 324 comprise a PAN 326. The headset 320 includes a proximity sensor 320a to determine whether the headset 320 and the cell phone 324 are greater than or less than a predetermined distance from each other. If they are less than the predetermined distance this is denominated a "near" state, whereas if they are greater than the predetermined distance this is denominated a "far" state. The "near" or "far" status is sent to the authentication server 222 as indicated by dashed line 328.

In one embodiment the proximity sensor 320a operates based on a received radio signal strength indication (RSSI). Systems for determining RSSI are known in the art. Most radio manufacturers who report RSSI generally estimate the received signal power at the antenna either by direct measurement, or digital signal processing, and report a monotonically increasing number with respect to this power. The number is often calibrated to track power linearly and report the value in dBm.

A mobile radio and/or base station can monitor the RSSI level. When the RSSI exceeds a specified power level, the radio can be declared NEAR and when below the level, it can be declared FAR. In some cases, requiring both a mobile radio and a base proximity to agree for a state change can provide a more accurate measure of proximity since false status for any given measurement can occur due to multi-path fading. Often fading for base and mobile are independent. Hysteresis can also be used to minimize superfluous state changes due to multi-path fading.

In other embodiments the proximity sensor 320a can operate based on other principles. For example, U.S. patent application Ser. No. 11/697,087, filed Apr. 5, 2007, and entitled "Headset-Derived Real-Time Presence Communication Systems and Methods" describes systems and methods for determining proximity between an intelligent headset and a base station. For example a tri-axis linear accelerometer system configured to operate as an internal navigation system is described, and a system using a radio frequency identification (RFID) transceiver is also described. These descriptions are incorporated herein by reference. In some cases such systems and methods could be used for the proximity sensor 320a of the present application.

Regarding the operation of the headset 320, the headset 320 communicates the Don/Doff state to the cell phone 324 via a Bluetooth encrypted link 329, and the cell phone 324 in turn communicates the Don/Doff state to the authentication server 222 by a secure wireless data link, such as a cellular telephone link 330. Alternatively, the user authentication device 320 can directly communicate the Don/Doff state to the authentication server 222, as indicated by dashed line 328. If the Don/Doff state is Don and the near/far state is "near" then the authentication server 222 allows authentication to occur if it has not yet occurred or allows it to maintain the authenticated status if authentication has occurred. However, if the state is Doff or the state is "far" then the authentication server disallows authentication to occur or revokes authentication if it has already occurred. After authentication has taken place, if either the Doff state or the "far" state occurs then the authentication server 222 revokes authentication of the system.

As an additional security feature either the cell phone 324 or the headset 320 or both can have a control/button that would cause de-authentication. In this illustrated embodiment the headset 320 includes button 323 and the cell phone includes button 325 for this purpose. The user would press the button 323 or 325 if they felt threatened that someone was about to steal something or were setting down their system for a moment. In this embodiment the keypad of the cell phone 324 includes the button 325 to de-authenticate the system. Alternatively, the headset 320 can include voice recognition software to allow the user to speak a predetermined word such as "revoke" to revoke authentication.

The FIG. 8 embodiment is similar to the FIG. 7 embodiment except the FIG. 8 embodiment includes a BAN 332 which comprises a first authentication device 320, a cell phone 324 and a second authentication device 334, which in this embodiment is a watch with a DON/DOFF detector. The DON/DOFF detector of the watch 334 can be constructed as is the DON/DOFF detector of the headset 320 discussed above. It should be understood that PANs and BANs include means to determine when network connectivity has been lost. Loss of network connectivity can be used to signify lack of proximity. In other words, a NEAR condition corresponds to the existence of network connectivity whereas a FAR condition corresponds to the absence of network connectivity. Alternatively, a proximity sensor 320a can be included in one or more components of the network for determination of a NEAR or FAR condition.

In operation of this embodiment if the Don/Doff state of both the first authentication device 320 and the second authentication device 334 are Don and the near/far state is "near" then the authentication server 222 allows authentication to occur if it has not yet occurred or allows authentication to continue if authentication has occurred. However, if the state of both the first authentication device 320 and the second authentication device 334 is Doff or the state of any member of the BAN is "far" then the authentication server 222 disallows authentication to occur or revokes authentication if it has already occurred. After authentication has taken place, if all authentication items are in the Doff state or the "far" state occurs for any member of the BAN then the authentication server 222 revokes authentication of the system.

It should be understood that often an authenticator (i.e. person or software that wants to authenticate the user) makes use of an authentication/identity server. An authentication identity provider/server does the following with respect to the authentication state of the user to the authenticator:

Takes in user specific data (password, card ID, biometrics hereafter called "credentials")
Analyzes credentials and determines authentication status
Records when a successful or failed authentication occurs
Monitors authentication expiration time for a given user
Revokes authentication under specified conditions or events (timeout for example)
Reports to requestors the authorization status of a given user
Provides a cookie/ticket/certificate/key which are typically small amounts of digital data (hereafter called "digital credentials") to an authenticator (a website server for example) or user agent (browser software for example).

The server contains an analyzer. It examines the user/password data, token information or biometric data and generates digital credentials based on this data. The authenticator has shared data or a database for its users and compares the digital credentials received from the server to its data. The authentication server and the authenticator can be collocated. In particular, the server can be a subsystem of the authenticator. Alternatively, the authentication server and the authenticator can be separately located.

Also, after a first remote authenticator has authenticated a user another remote authenticator may wish to establish that a user is authenticated. This is done by the remote authenticator asking a trusted authentication server about a user's status. In order for this to work without requesting credentials from the user again, the server must store the user's digital credentials. The location where one or more digital credentials are stored at an authentication server will be called here an authentication credential cache. In this case, a server with a credential cache can send digital credentials previously stored to a remote authenticator.

An example of this is when a user logs onto his computer, he has authenticated himself to his computer (regardless of whether the network is attached or not). When attached to his PC, the network server (a remote authenticator) consults the software on his PC (the local authentication server) to determine whether he is authenticated. The user typically does not have to log on manually to every server his computer networks with. In this case, the PC is acting like an authentication server with a credential cache providing the user authentication to the network.

Figure 9:
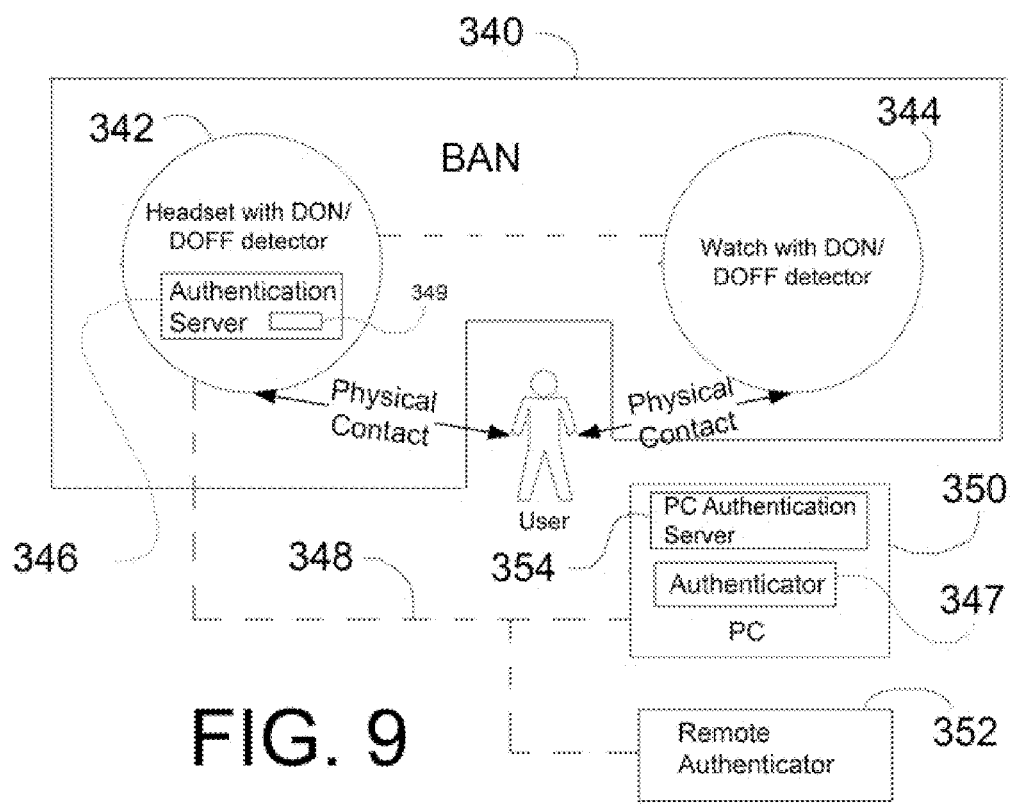
FIG. 9 is a block diagram of another embodiment of the present user authentication system.

In FIG. 9 another embodiment is illustrated. This embodiment includes a mobile and secure authentication server with a credential cache, which can eliminate the tedium of data re-entry and at the same time decrease risk of theft.

In this embodiment a BAN 340 includes a headset 342 and a watch 344, each of which includes a don/doff detection system. An authentication server 346 resides in the headset 342, and an authenticator 347 and a PC authentication server 354 reside in the user's PC 350. The authentication server 346 includes a credential cache 349, although optionally the credential cache 349 can be omitted. A NEAR condition corresponds to the existence of network connectivity of BAN 340; whereas a FAR condition corresponds to the absence of network connectivity. Alternatively, a proximity sensor 320a can be included in one or more components of the network for determination of a NEAR or FAR condition.

In operation, the user can sit at the keyboard of his PC 350, wearing his headset 342 and watch 344 and type his password into the PC. The PC authentication server 354 validates the password. The authentication server 346 validates the Don states of the headset 342 and watch 344 and transmits an indication of this validation to the PC authentication server 354, and the PC authentication server 354 authenticates the user. Using a Bluetooth link 348, the PC 350 (authenticator) communicates to the headset (server) 346 that the user is authenticated. The headset passes this information to the watch 344. The headset 342 and watch 344 continue to monitor their DON/DOFF states. The PC authenticator 347 continues to query the headset server 346 for authentication as needed.

The user removes his headset 342 and puts it in his pocket. He then proceeds to eat lunch at his desk. The removal is detected, but since the headset 342 is still part of the BAN 340 and the watch 344 is still worn (DON) the headset server 346 stays authenticated. The user can wander to other PCs or leave and come back without the need to re-enter his credentials, since the server 346 retains the authenticated state and monitors DON/DOFF and proximity of the watch and headset.

The user logs on to EBAY and proceeds to purchase some skis. EBAY uses a remote authenticator 352 that is aware of the authentication server 346 on the headset. The EBAY remote authenticator 352 queries the PC authenticator 347 that communicates with the headset 342 and validates the user. The sale proceeds.

Later the battery runs down in the headset 342 and the server 346 is lost. The user is forced to log in to his computer 350 and online applications the old fashioned way every time he exceeds its timeout.

Figure 10:
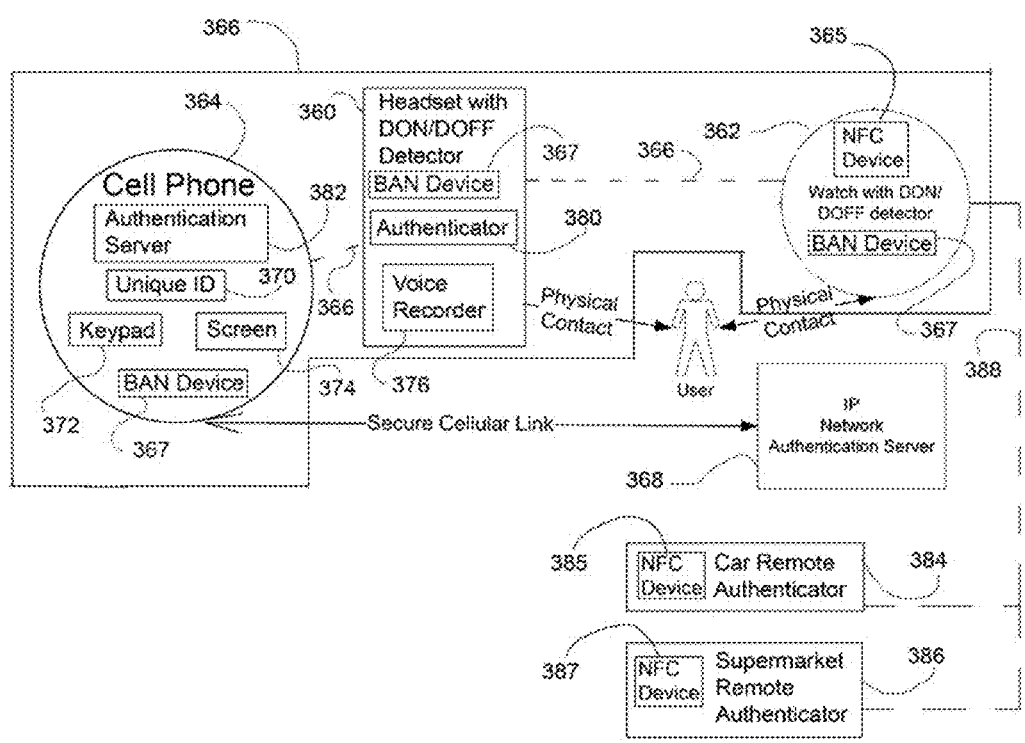
FIG. 10 is a block diagram of another embodiment of the present user authentication system.

In FIG. 10 another embodiment is illustrated. This embodiment includes a headset 360 which includes a don/doff detection system, a watch 362 which includes a don/doff detection system, and a cell phone 364. The cell phone 364 or watch 362 or both include near field communication device 365, NFC, for communication to a remote authenticator. The cell phone 364 and watch 362 also communicate with each other and the headset 360 over a BAN 366 (with BAN devices 367) or a PAN. This embodiment also includes a network authentication server 368 and an authenticator such as a car remote authenticator 384. The headset 360 has an authenticator 380 in it and the cell phone 364 includes an authentication server 382. Optionally either the headset 360 or the cell phone 364 could have both an authenticator and an authentication server or neither, but the system should have at least one of each. It should be noted that the user can authenticate to this system using the I/O device of the phone or headset, and the headset/cell authenticator can decide to allow services based on this authentication. Just as in the system discussed above in connection with FIG. 9, a remote authenticator can determine the authentication state by querying the headset or cell phone server over a secure link. Again, the user does not need to re-enter credentials. The short range of NFC localizes the communication, providing security as well as localization of the transaction. The BAN 366 relays digital credentials from the cell phone authentication server 382 or headset authentication server, not shown (the servers can be in either or both) to an NFC device 385, 387 on the remote authenticator 384 or 386 allowing the user to be authenticated without re-entry of credentials.

A NEAR condition corresponds to the existence of network connectivity of BAN 366; whereas a FAR condition corresponds to the absence of network connectivity. Alternatively, a proximity sensor 320a can be included in one or more components of the network for determination of a NEAR or FAR condition.

The following example illustrates the operation of this embodiment. The user wakes up and puts on his watch 362, puts on his headset 360 and puts his cell-phone 364 in his pants pocket. All devices are powered on, enabling the BAN network 366. When the user puts on his headset 360, he is prompted by the headset (authenticator) to authenticate. He enters in his pass code. The collection of BAN networked devices has now been authenticated and the cell phone 364 acts as an authentication server.

As he approaches his car he waves his watch 362 over the car door. The car (which includes a remote authenticator 384) tries to authenticate him through the authentication server 382, communicating over an NFC connection 388 through the watch 362. He checks out and the car unlocks.

At the supermarket, he buys some snacks and waves his watch 362 over the display in the checkout line. The watch 362 communicates with the remote authenticator 386 at the supermarket using the NFC connection 388, passing information to the authentication server 382 and validates that the user is who he says he is. It also passes the credit card information which was previously stored and encrypted on the cell phone to make the purchase.

He is mugged outside the supermarket and his cell phone 364 is stolen. Since it is no longer in the BAN network 366, the BAN network 366 tells the authentication server 382 to de-authenticate and is no longer good for groceries or getting into a car.

It should be understood that if someone runs off with the headset 360 (or cell phone 364 or watch 362), and is possibly tricky enough to keep the DON sensor on (say by covering it with their finger), authentication is nevertheless revoked because the proximity between the BAN devices 367 is broken (or FAR) when they move a BAN device away from the system.

Another important feature of this NEAR/FAR aspect is that the user can configure his system to REVOKE only on FAR so that merely DOFFing the headset is not a requirement for revocation.

The user (or authentication system) may wish to use an external authentication server 368. For example, the user is using their cell phone 384 to make a purchase over the Internet using the cellular link. This requires authentication from the server 368. In this case, the server 368 does not trust the authentication state provided by the cell phone server 382 and wants to validate directly the digital credentials provided by the cell phone authentication server 382. Optionally the cell phone 364 or headset 360, or both includes a unique ID number 370 stored in hardware or a computer memory such as firmware which provides an additional piece of information for the authentication server 368 to use to authenticate the user. This data can be hashed and encrypted (MAC or digital signature) using a device key using data integrity to sign the unique ID. Also, as another option the key pad 372 and screen 374 of the cell phone 364 can be constructed and arranged to function as an input-output device to enable the user to interact with the authentication server 368 e.g. to enter additional data such as a password and user ID for user authentication. It should be understood that these options can also be included as part of the embodiments shown in FIGS. 1-9 above.

As a further option the headset 360 or cell phone 364, or both can include a biometric authentication system 376, which in this embodiment is a voice recorder application stored in the headset 360. In the voice recorder application the user's voice is digitized, compressed and stored. This data can be hashed and encrypted (MAC or digital signature) using a device key using data integrity to sign the unique ID. The authentication server 368 can validate the source of the biometrics and if valid proceed to analyze to add the further factor of authentication. It should be understood that this option can also be included as part of the embodiments shown in FIGS. 1-9 above.

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. In summary, the scope of the invention should not be restricted to the specific exemplary embodiments disclosed herein, and all modifications that are readily suggested to those of ordinary skill in the art should be included within the spirit and purview of this application and scope of the appended claims.

What is claimed is:

1. A user authentication system, comprising:
   an authentication device which can be donned and doffed by a user;
   a sensor coupled to said authentication device to determine whether said authentication device is donned or doffed by the user;
   an authentication server to receive information from said sensor; and
   a motion sensor coupled to said authentication device to determine motion of said authentication device, wherein said authentication server receives information from said sensors;
   said authentication server maintains authentication of the user while the device is donned by the user and
   said authentication server revokes authentication of the user when
      said authentication device is doffed and
      said authentication device after being doffed has been stationary for greater than a predetermined time.

2. The user authentication system according to claim 1, wherein said authentication server authenticates the user when said authentication device is donned by the user.

3. The user authentication system according to claim 1, wherein said authentication device comprises a headset or a headphone.

4. The user authentication system according to claim 1 wherein said authentication server is coupled to said authentication device.

5. The user authentication system according to claim 1 wherein said authentication server is not coupled to said authentication device.

6. A method of authenticating a user with a system including an authentication device which can be donned and doffed by the user, the method comprising:
   determining whether said authentication device is donned by the user; and
   authenticating the user based on whether said authentication device is donned or doffed by the user; and
   revoking the authentication of the user when said authentication device is doffed by the user and after being doffed has been stationary for greater than a predetermined time.

7. The method of authenticating a user according to claim 6, further comprising authenticating the user when the authentication device is donned by the user.

8. A method of authenticating a user with a system including an authentication device which can be donned and doffed by a user and a further device, the method comprising:
   determining a near state or a far state based on the distance between said authentication device and said further device;
   determining whether said authentication device is donned or doffed by the user;
   authenticating the user if said authentication device is donned and said near state is determined; and
   revoking authentication if id authentication device is doffed or said far state is determined.

9. The method of authenticating a user according to claim 8, wherein said further device comprises a second authentication device that can be donned and doffed by the user. and the method further comprises:
   determining whether said second authentication device is donned or doffed by the user; and
   authenticating the user if both of said authentication devices are donned and said near state is determined; and
   revoking authentication if both of said authentication devices are doffed or said far state is determined.

10. A user authentication system, comprising:
    an authentication device;
    a further device;
    a sensor coupled to said authentication device to determine whether said authentication device is donned or doffed by a user, and
    an authentication server, wherein
    at least one of said authentication device and said further device is adapted to determine a near state and a far state based on the distance between said authentication device and said further device, wherein
    said authentication server is configured to receive information from at least one of said authentication device and said further device, to authenticate the user if said authentication device is donned and said near state is determined, and to revoke authentication if said authentication device is doffed or said far state is determined.

11. The user authentication system according to claim 10, wherein said further device comprises a cell phone.

12. The user authentication system according to claim 10, wherein said further device comprises a second authentication device.

13. The user authentication system according to claim 12, wherein said second authentication device comprises a second sensor coupled to said second authentication device to determine whether said second authentication device is donned or doffed by a user, and wherein said authentication server is configured to authenticate the user if both of said authentication devices are donned and said near state is determined, and to revoke authentication if both of said authentication devices are doffed or at least said far state is determined.

14. The user authentication system according to claim 12, wherein said second authentication device is constructed and arranged to be worn by the user or carried in a garment worn by the user.

15. The user authentication system according to claim 10, wherein said authentication device is constructed and arranged to be worn by the user or carried in a garment worn by the user.

16. The user authentication system according to claim 10, wherein said authentication device comprises a headset or a headphone.

17. The user authentication system according to claim 10, further comprising a proximity sensor coupled to at least one of said authentication device and said further device to determine a distance between said authentication device and said further device.

18. The user authentication system according to claim 17, wherein said near state is determined if the distance between said authentication device and said further device is less than or equal to a predefined distance, and said far state is determined if the distance between said authentication device and said further device is greater than said predefined distance.

19. The user authentication system according to claim 10, wherein said authentication device and said further device are configured to communicate with each other over at least one of a body area network and a personal area network, and wherein said near state is determined if network connectivity is given between said authentication device and said further device.

20. The user authentication system according to claim 19, wherein a far state is determined if no network connectivity is given between said authentication device and said further device.

21. The user authentication system according to claim 10, wherein said authentication server is coupled to said authentication device.

22. The user authentication system according to claim 10, wherein said authentication server is not coupled to said authentication device.

23. The user authentication system according to claim 10, wherein said authentication device further comprises a motion sensor coupled to said authentication device to determine motion of said authentication device, wherein
 said authentication server is configured to revoke authentication if said authentication device is doffed and has been stationary for greater than a predetermined time or at least said far state is determined.

\* \* \* \* \*